US011306002B2

(12) United States Patent
Kinge et al.

(10) Patent No.: US 11,306,002 B2
(45) Date of Patent: Apr. 19, 2022

(54) PROCESS FOR SYNTHESIS OF MG2SI/MGO NANOCOMPOSITES

(71) Applicants: TOYOTA MOTOR EUROPE, Brussels (BE); UNIVERSITÄT SALZBURG, Salzburg (AT)

(72) Inventors: Sachin Kinge, Brussels (BE); Michael S. Elsaesser, Hallein (AT); Raphael Berger, Salzburg (AT); Nastaran Hayati-Roodbari, Salzburg (AT)

(73) Assignees: TOYOTA MOTOR EUROPE, Brussels (BE); UNIVERSITÄT SALZBURG, Salzburg (AT)

( * ) Notice: Subject to any disclaimer, the term of this patent is extended or adjusted under 35 U.S.C. 154(b) by 332 days.

(21) Appl. No.: 16/491,741

(22) PCT Filed: Mar. 7, 2017

(86) PCT No.: PCT/EP2017/055235
§ 371 (c)(1),
(2) Date: Sep. 6, 2019

(87) PCT Pub. No.: WO2018/162036
PCT Pub. Date: Sep. 13, 2018

(65) Prior Publication Data
US 2021/0130175 A1 May 6, 2021

(51) Int. Cl.
*C01B 33/06* (2006.01)
*C01F 5/02* (2006.01)
*B82Y 40/00* (2011.01)

(52) U.S. Cl.
CPC ............. *C01B 33/06* (2013.01); *C01F 5/02* (2013.01); *B82Y 40/00* (2013.01)

(58) Field of Classification Search
CPC ....... B82Y 40/00; C01B 33/06; C01B 33/122; C01B 33/113; C01B 33/12; C01B 33/00;
(Continued)

(56) References Cited

U.S. PATENT DOCUMENTS 10,468,577 B2 * 11/2019 Nakada ................ C04B 35/645
2010/0092141 A1   4/2010 Li et al.
(Continued)

FOREIGN PATENT DOCUMENTS

WO   2010/027782 A2   3/2010
WO   2017/072064 A1   5/2017

OTHER PUBLICATIONS

Rosaria Ciriminna et al, The Sol-Gel Route to Advanced Silica-Based Materials and Recent Applications, Jun. 19, 2013, ACS (Year: 2013).*

(Continued)

*Primary Examiner* — Anthony J Zimmer
*Assistant Examiner* — Logan Edward Laclair
(74) *Attorney, Agent, or Firm* — Sughrue Mion, PLLC (57) ABSTRACT

The present invention relates to a process for the synthesis of a composite material comprising steps of:
  (a) reacting gaseous magnesium (Mg) and silica ($SiO_2$) in an inert atmosphere;
  (b) washing the product obtained in step (a) in an acidic medium; and
  (c) reacting further gaseous magnesium (Mg) with the silica ($SiO_2$) and silicon (Si) product obtained in step (b).

The process of the invention allows $Mg_2Si/MgO$ nanocomposites to be prepared without too many separate steps, and wherein the MgO phase is homogeneously dispersed within the $Mg_2Si$ matrix. The nanocomposites obtained may for example find practical application as thermoelectric materials in thermoelectric generators.

17 Claims, 6 Drawing Sheets

(58) Field of Classification Search
CPC ..... C01B 33/128; C01B 33/181; C01B 33/22; C01B 33/24; C01F 5/00; C01F 5/02; C01F 5/06; B01J 12/005; B01J 15/00
See application file for complete search history.

(56) References Cited

U.S. PATENT DOCUMENTS

2015/0299823 A1* 10/2015 Pisch ................. C01F 5/06
423/155
2018/0208474 A1* 7/2018 Kim ................... B01J 31/02

OTHER PUBLICATIONS

Junhua Hu et al., Growth condition dependence of structural and electrical properties of Mg2Si layers grown on silicon substrates, Aug. 11, 2011, Vacuum (Year: 2011).*

Waitzinger et al. (Self-supporting hierarchically organized silicon networks via magnesiothermic reduction, Oct. 19, 2015, Chemical Monthly, Introduction, Paragraph 2) (Year: 2015).*

ALOthman et al. (A Review: Fundamental Aspects of Silicate Mesoporous Materials, Dec. 17, 2012, Materials, p. 2875 paragraph 2). (Year: 2012).*

Rahman et al. (Effects of Double Sintering on the Properties of Porous Ceramic, Jan. 2008) (Year: 2008).*

Michael Waitzinger, et al., "Self-supporting hierarchically organized silicon networks via magnesiothermic reduction", Monatsh Chem 2016, pp. 269-278, pp. 147.

Ke Chen, et al., "Freestanding monolithic silicon aerogels", Journal of Materials Chemistry, 2012, pp. 16196-16200, vol. 22.

H D Banerjee, et al., "Investigations on the Production of Silicon from Rice Husks by the Magnesium Method", Materials Science and Engineering, 1982, pp. 173-179, vol. 52.

D. Cederkrantz, et al., "Enhanced thermoelectric properties of Mg2Si by addition of TiO2 nanoparticles", Journal of Applied Physics, 2012, pp. 023701-1 to 023701-7, vol. 111.

Jeannine R. Szczech, et al., "Mg2Si nanocomposite converted from diatomaceous earth as a potential thermoelectric nanomaterial", Journal of Solid State Chemistry, 2008, pp. 1565-1570, vol. 181.

International Search Report for PCT/EP2017/055235 dated Jun. 1, 2017 [PCT/ISA/210].

* cited by examiner

Step 1:

Silica (monolith, powder) / Mg $$SiO_2 + (2-2x)Mg \xrightarrow{\Delta, Ar} Si + xSiO_2 + (2-2x)MgO$$

Silica + MgO + Silicon

Step 2:

$$MgO(s) + 2\,HCl(aq) \rightarrow MgCl_2(aq) + H_2O$$

Step 3:

Silica + Silicon / Mg $$Si + SiO_2 \longrightarrow MgO + Mg_2Si$$

Mg$_2$Si + MgO

PROCESS FOR SYNTHESIS OF MG2SI/MGO NANOCOMPOSITES

CROSS REFERENCE TO RELATED APPLICATIONS

This application is a National Stage of International Application No. PCT/EP2017/055235, filed on Mar. 7, 2017.

FIELD OF THE INVENTION

The present invention relates to a process for preparing $Mg_2Si/MgO$ nanocomposites, which may for example find practical application as thermoelectric materials in thermoelectric generators.

BACKGROUND ART

Thermoelectric materials allow for direct conversion of thermal energy into electricity. Such materials are of interest for example in waste heat recovery and may be of particular value in the automobile industry.

Thermoelectric generators (TEGs) typically show a set of n- and p-type conductive materials connected electrically in series and thermally in parallel. The Seebeck coefficient (S), electrical conductivity ($\sigma$) and thermal conductivity ($\kappa$) can be combined in the dimensionless figure-of-merit $ZT=TS^2\sigma/\kappa$, where T is the absolute temperature of operation, a high ZT value being desirable.

For thermoelectric (TE) applications nanocomposite materials like $Mg_2Si/MgO$ have higher ZT values (figure of merit for TE) than conventional semiconductor materials.

The following non-patent literature documents illustrate previously published disclosures of magnesiothermic reduction of silica (reduction by elemental magnesium at high temperature), and nanocomposites based on magnesium silicide $Mg_2Si$ or with magnesia (MgO) dispersed in a matrix:
1. Chen, K.; Bao, Z.; Shen, J.; Wu, G.; Zhou, B.; Sandhage, K. H. *Journal of Materials Chemistry* 2012, 22, 16196.
2. Banerjee, H. D.; Sen, S.; Acharya, H. N. *Materials Science and Engineering* 1982, 52, 173.
3. Waitzinger, M.; Elsaesser, M. S.; Berger, R. J. F.; Akbarzadeh, J.; Peterlik, H.; Husing, N. *Monatshefte für Chemie* 2016, 147, 269.
4. Cederkrantz, D.; Farahi, N.; Borup, K. A.; Iversen, B. B.; Nygren, M.; Palmqvist, A. E. C. *Journal of Applied Physics* 2012, 111, 023701.
5. Szczech, J. R.; Jin, S. *Journal of Solid State Chemistry* 2008, 181, 1565.

Among problems in this field it is a difficulty to provide $Mg_2Si/MgO$ nanocomposite material in controlled ratios. Further, providing the desired nano-structured morphology and at the same time a homogeneous distribution of MgO in the $Mg_2Si$ matrix is difficult to achieve.

SUMMARY OF THE INVENTION

In one aspect, the present invention relates to a process for the synthesis of a composite material comprising the steps of:
(a) reacting gaseous magnesium (Mg) and silica ($SiO_2$) at a temperature of at least 500° C. and at most 1200° C. in an inert atmosphere;
(b) washing the product obtained in step (a) in an acidic medium until neutralization is achieved; and
(c) reacting further gaseous magnesium (Mg) with the silica ($SiO_2$)+silicon (Si) product obtained in step (b) at a temperature of at least 500° C. and at most 1200° C. in an inert atmosphere.

The process of the invention does not require too many separate steps, and enables the MgO phase to be homogeneously dispersed within the $Mg_2Si$ matrix such that phonon dispersion causes a lowering of the thermal conductivity. The nanocomposite materials obtained contain nano-sized MgO domains with 10-30 nm in particle size.

DETAILED DESCRIPTION OF THE INVENTION

Step (a)

Figure 1:
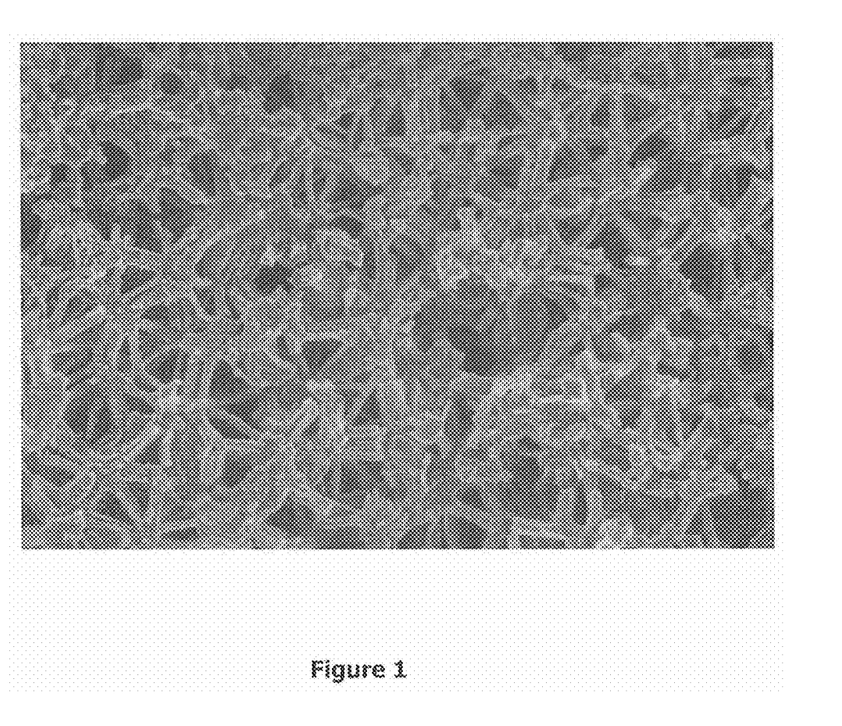
FIG. 1 shows a scanning electron microscopy (SEM) image of $Mg_2Si/MgO$ composites with controlled ratio, obtained according to a non-limiting illustrative embodiment of the process of the present invention.
Figure 2:
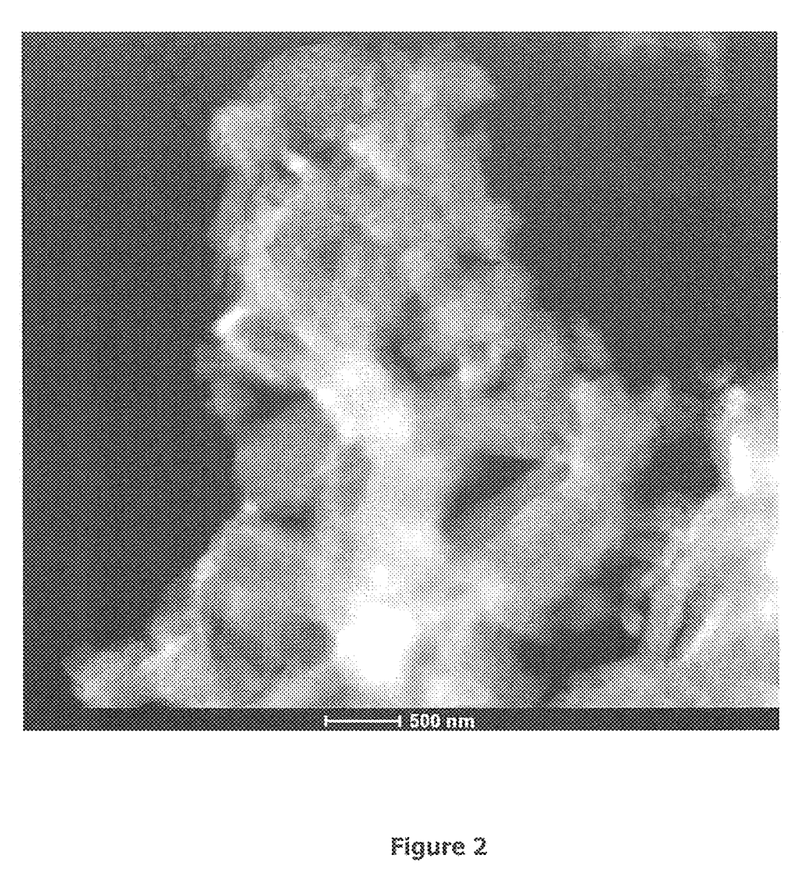
FIG. 2 shows a transmission electron microscopy (TEM) image of $Mg_2Si/MgO$ composite, obtained according to a non-limiting illustrative embodiment of the process of the present invention.
Figure 3:
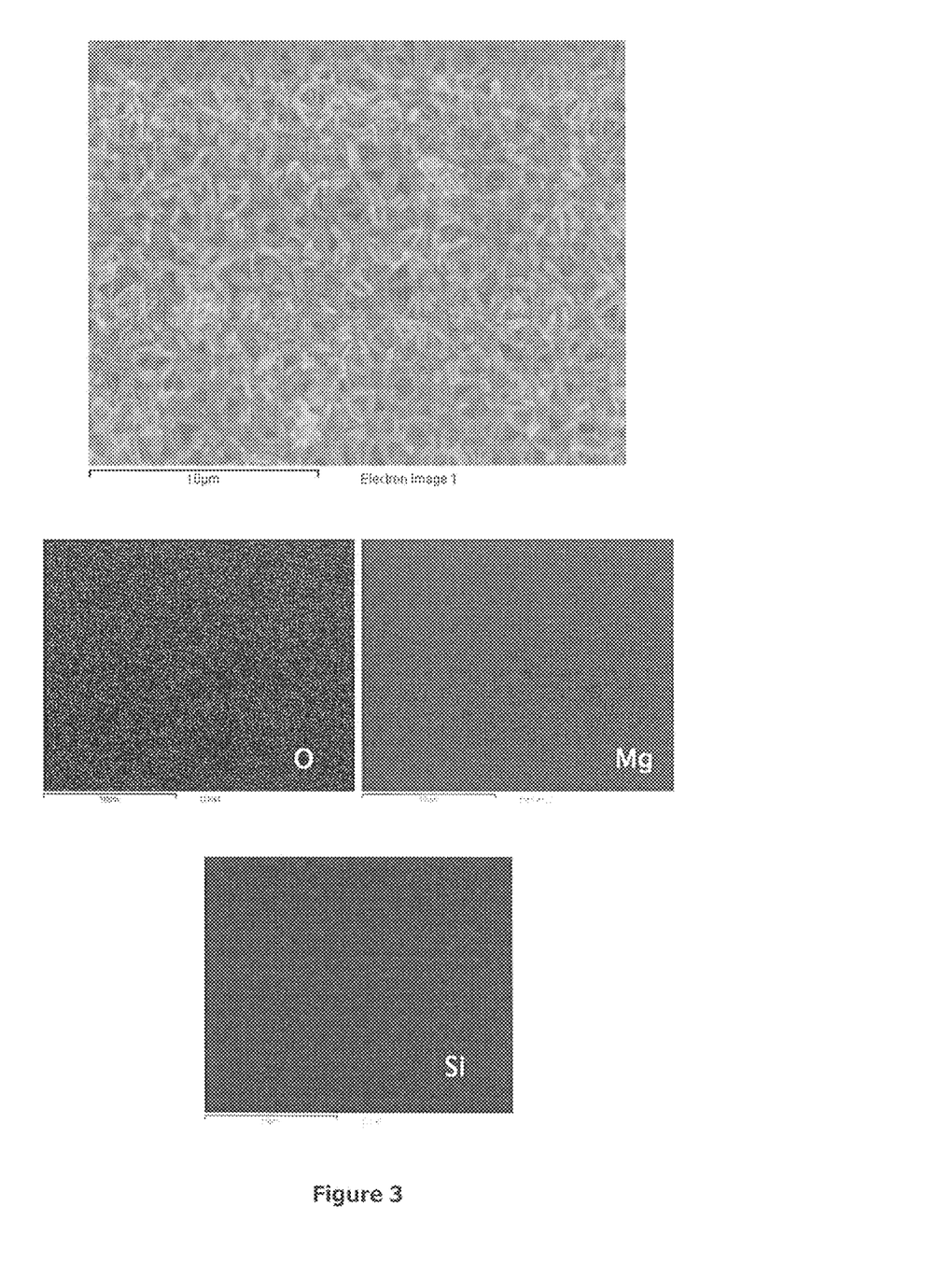
FIG. 3 shows an elemental analysis and the distribution of Mg, Si and O by energy dispersive X-ray spectroscopy (EDX) of the shown SEM image. It can be visually noted by the small spots that the MgO distribution in a $Mg_2Si$ matrix is homogeneous, in a material obtained according to a non-limiting illustrative embodiment of the process of the present invention.
Figure 4:
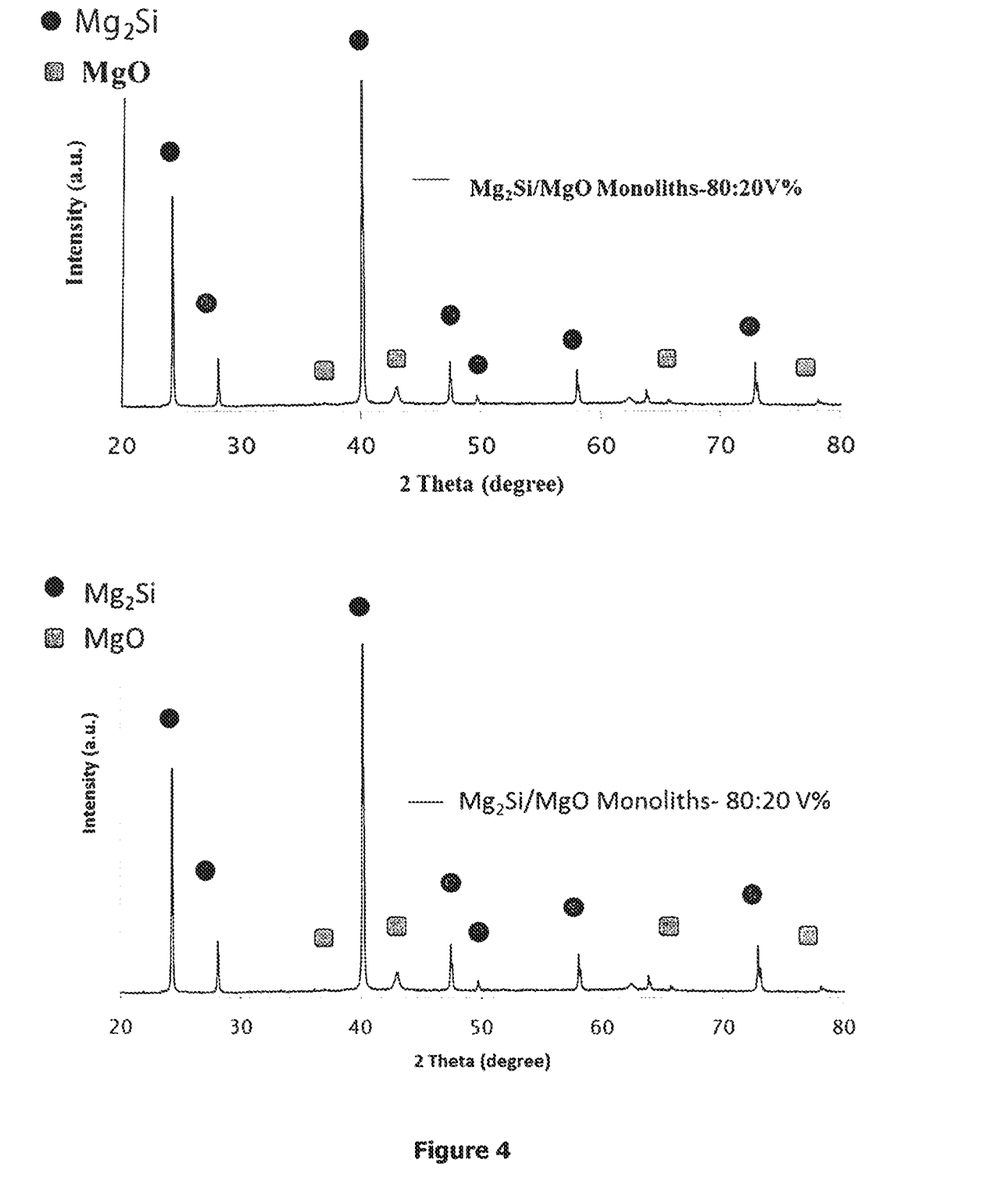
FIG. 4 shows an X-ray diffraction (XRD) pattern of $Mg_2Si/MgO$ composite, obtained according to a non-limiting illustrative embodiment of the process of the present invention.
Figure 5:
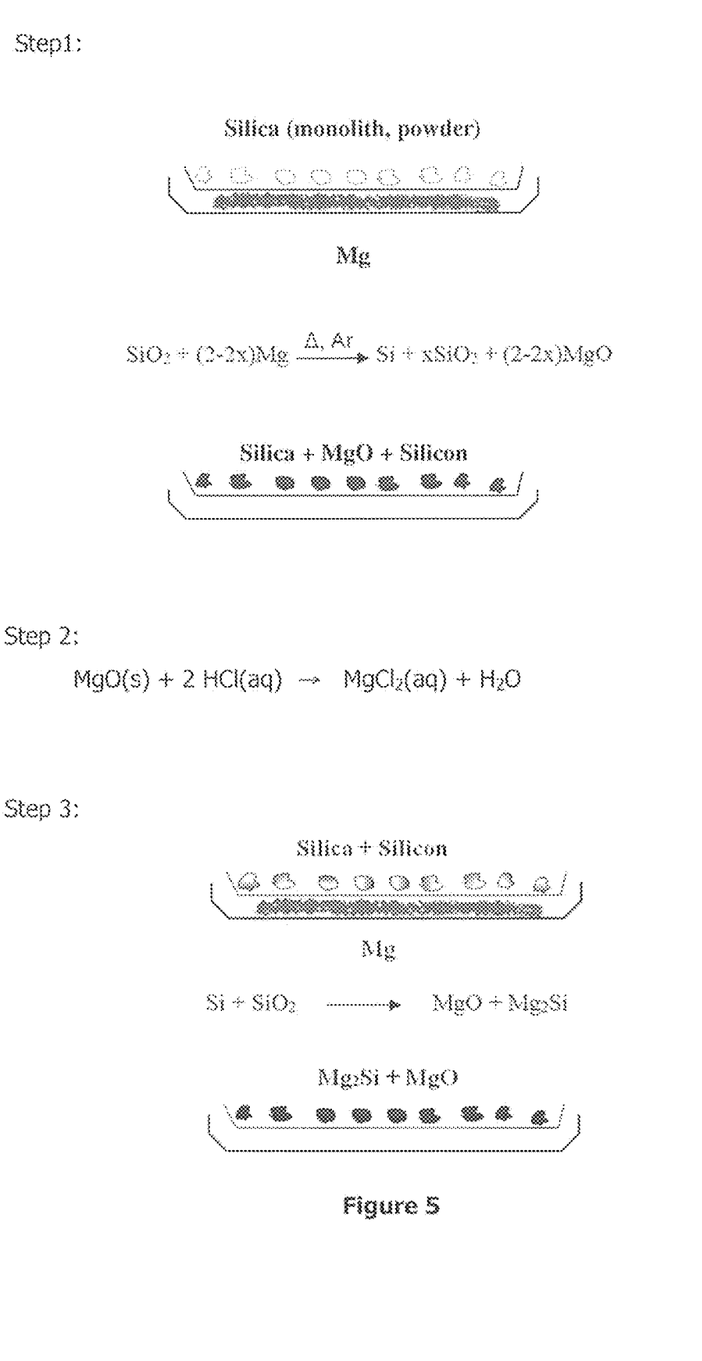
FIG. 5 shows an illustrative and non-limiting embodiment of the process of the present invention wherein Step 1 is an un-completed magnesiothermic reduction, Step 2 washing of the undesired magnesium derivatives, and Step 3 a magnesiothermic method combined with stoichiometric reaction of magnesium and silicon/silica.
Figure 6:
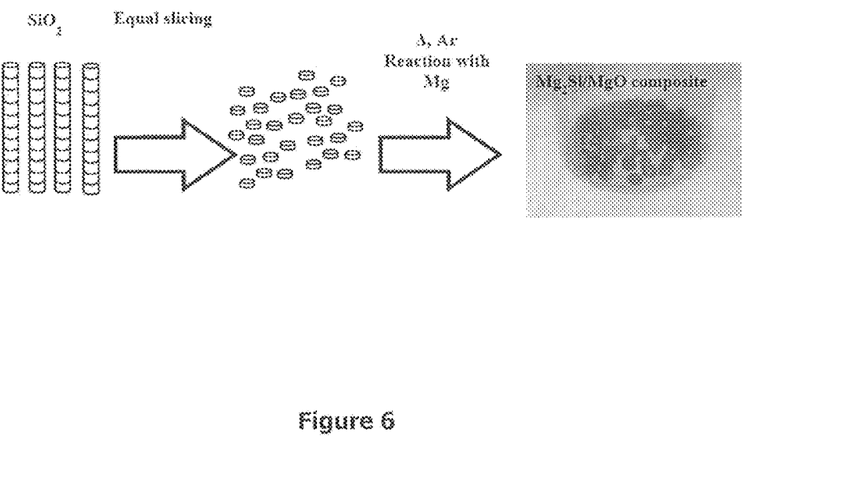
FIG. 6 shows a magnesiothermic reaction of $SiO_2$ and Mg according to a non-limiting illustrative embodiment of the process of the present invention.

Precursors including $SiO_2$ and Mg are typically pre-treated, in order to be applied for the further steps of reaction.

$SiO_2$:

$SiO_2$ used in step (a) can be in the form of, for example, cylindrical silica (i.e. silica fibers in the form of cylinder) and powdered silica.

Cylindrical silica used preferably has a diameter of 5 to 20 mm, and a height of 1 to 5 mm.

Powdered silica used preferably has particle size ranges of 100-1000 nm, and mesopore sizes in the range of 2-50 nm and porosities between 70-95%.

$SiO_2$ used in step (a) can be prepared by any appropriate method known in the art. It can be prepared, for example, through a sol-gel processing of modified orthosilicate in an aqueous medium. The aqueous media here can be, for example, one containing a surfactant such as Pluronic P123 from BASF, Ludwigshafen ($HO(CH_2CH_2O)_{20}(CH_2CH(CH_3)O)_{70}(CH_2CH_2O)_{20}H$) and an acid, such as for example, 1M hydrochloric acid. The gel is aged for several days at an appropriate temperature, for example, at 40° C.

Afterward, $SiO_2$ is washed with different solvents to extract the surfactant. In order to remove organic groups completely to prepare pure $SiO_2$, the obtained product may be calcined, for example, for 4 hours at 550° C. $SiO_2$ may then be processed in the shape of sliced silica monoliths, for example in the form of monoliths with a diameter of 3-20 mm, preferably 5-20 min, and a thickness of 1-5 mm.

Substantially equal dimension of silica slices used as a starting material may improve the homogeneity of the final product.

Regarding commercial silica sources for usage, it is possible to use synthetic MCM-41 or SBA-15 for instance.

Mg:

Mg used in step (a) can be in the form of, for example, powdered Mg.

Powdered Mg with particle size of 0.1-1 mm can be used. Since Mg used might well comprise some impurities, the MgO impurities can be taken into account by calculating a higher initial overall amount of the Mg powder.

Reaction Conditions of Step (a)

In step (a), gaseous magnesium (Mg) and silica ($SiO_2$) are reacted in an inert atmosphere.

The molar ratio of Mg:$SiO_2$ in step (a) is preferably at least 0.5 and at most 2.5, and more preferably, 2.

The reaction can be carried out in any setup, which serves for a spacial separation of the educts. Such a setup can consists of, for example, a mesh grid with a mesh size of 0.02-0.3 mm on top to place $SiO_2$ monoliths on and a "boat" underneath to fill in the Mg powder (so-called "boat-mesh setup").

A boat-mesh setup is preferred since it allows one to separate Mg and the silica source.

The reaction of step (a) is carried out at a temperature of at least 500° C. and at most 1200° C.

The maximum temperature reached during step (a) is preferably at least 500° C. and at most 1200° C., and more preferably 600-800° C. Such temperatures may be used for reaction oven temperature profile programming, but temperature within the reacting material may exceed programmed values in view of the exothermic nature of the reaction.

The duration of step (a) is preferably at least 30 min, and at most 5 hrs, and more preferably, 30 min to 2 hrs.

The maximum temperature is reached preferably by heating from room temperature at a rate of at least 10° C./min and at most 30°/min.

The inert atmosphere can be any inert gas, such as, nitrogen ($N_2$) and argon (Ar), and is preferably argon. When argon is used as inert atmosphere, any side reactions of nitrogen with magnesium at elevated temperatures can be excluded.

After the reaction of step (a) is finished, the product is preferably cooled down to an ambient temperature, by any appropriate method, for example, just by turning off the oven.

Reaction Conditions for Step (b)

The product thus obtained in step (a) is then washed in an acidic medium until neutralization is achieved.

Here, the acidic medium can be a mineral acid, such as, for example, HCl, $H_2SO_4$, $HNO_3$, and preferably HCl.

The concentration of the acidic medium can be for example 0.1 M-5 M, and preferably 1 M.

An acidic medium of preference is 1M-HCl.

The term "neutralization" as used herein means a point, when further washing with normal demineralized water causes no change in the pH (corresponding the a pH of the washing water of 6-7).

This point can be determined by any conventional technique such as pH indicator stripes.

Thus the washed product is then dried by any appropriate method, for example under vacuum.

Reaction Conditions for Step (c)

The silica ($SiO_2$) and silicon (Si) product obtained in step (b) is reacted with further gaseous magnesium (Mg) in an inert atmosphere.

The molar ratio of Mg:$SiO_2$ in step (c) is preferably at least 2 and at most 8, and more preferably, 2 to 3.

The maximum temperature reached during step (a) is preferably at least 500° C. and at most 1200° C., and more preferably 600-800° C. Such temperatures may be used for reaction oven temperature profile programming, but temperature within the reacting material may exceed programmed values in view of the exothermic nature of the reaction.

The maximum temperature reached during step (c) is preferably at least 500° C. and at most 1200° C., and more preferably at least 500° C. and at most 1200° C.

The duration of step (c) is preferably at least 30 min, and at most 5 hrs, and more preferably, 30 min to 2 hrs.

The maximum temperature is reached preferably by heating from room temperature at a rate of at least 0.5° C./min and at most 10° C./min.

The inert atmosphere can be any inert gas, such as, nitrogen ($N_2$) and argon (Ar), and is preferably argon. When argon is used as inert atmosphere, any side reactions of nitrogen with magnesium at elevated temperatures can be excluded.

After the reaction of step (c) is finished, the product is cooled down to an ambient temperature by any appropriate method, for example, just by turning off the oven.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present invention, but the scope of the invention is not to be considered to be limited to the specific examples that follow.

Three examples are presented below:

The desired final product is $Mg_2Si$ 70 Vol %:MgO 30 Vol % for Example 1, $Mg_2Si$ 80 Vol %:MgO 20 Vol % for Example 2, and $Mg_2Si$ 90 Vol %:MgO 10 Vol % for Example 3, respectively.

Step (a)

In a typical synthesis, Mg and hierarchically structured $SiO_2$ in the shape of sliced monoliths were reacted in the molar ratio as indicated in Table 1 below, in a boat mesh setup. The reaction setup was filled with argon and placed in a tube furnace, which allows heating under inert atmosphere.

The mixture was heated from an ambient temperature to the maximum temperature of e.g. 650° C., at a rate of 1° C./min, and then maintained at the maximum temperature of e.g. 650° C. for 2 hrs, in an oven which must be operated under an inert atmosphere.

After the reaction has completed, the obtained product was cooled down by turning off the oven, but still under inert conditions. Si, MgO, and remaining $SiO_2$ are comprised in the product obtained by step (a) (see table 2).

TABLE 1

| | Starting materials for step (a) | |
|---|---|---|
| | Mole of $SiO_2$ | Mole of Mg |
| Example 1 | 0.73 | 0.36 |
| Example 2 | 0.89 | 1.00 |
| Example 3 | 1.08 | 1.74 |

Step (b)

The product obtained by step (a) comprising MgO was washed out with 1M HCl. Further washing with demineralized water was done until neutralization was achieved.

The neutralization point was determined by pH indicator stripes.

The product was then dried under vacuum.

Step (c)

The product obtained in step (b) comprising remaining $SiO_2$ and Si was reacted with Mg, at the amount as indicated in Table 2 below. According to step (a) the product from step (b) is placed on a mesh and Mg powder is filled in the setup below the mesh. The whole system is purged with inert gas and placed in a tube furnace under inert atmosphere.

TABLE 2

| | Materials remaining from steps (a) and (b) | | Further reactant added in step (c) |
|---|---|---|---|
| | Mole of remaining $SiO_2$ | Si | Mole of Mg |
| Example 1 | 0.55 | 0.18 | 2.56 |
| Example 2 | 0.39 | 0.50 | 2.57 |
| Example 3 | 0.21 | 0.87 | 2.59 |

The mixture was heated from an ambient temperature to the maximum temperature of 650° C., at a rate of 1° C./min, and then maintained at the maximum temperature of 650° C. for 2 hrs, in an tube furnace.

After the reaction has completed, the obtained product was cooled down by turning off the oven, but still under inert conditions.

The invention claimed is:

1. A process for the synthesis of a composite material comprising the steps of:
   (a) reacting gaseous magnesium (Mg) and silica ($SiO_2$) at a temperature of at least 500° C. and at most 1200° C. in an inert atmosphere;
   (b) washing the product obtained in step (a) in an acidic medium until neutralization is achieved to obtain a product containing the silica ($SiO_2$) and silicon (Si); and
   (c) reacting further gaseous magnesium (Mg) with the product obtained in step (b) at a temperature of at least 500° C. and at most 1200° C. in an inert atmosphere.

2. The process according to claim 1, wherein the silica ($SiO_2$) used in step (a) consists of cylindrical slices with 5 to 20 mm in diameter and 1 to 5 mm in height.

3. The process according to claim 1, wherein the silica ($SiO_2$) used in step (a) consists of silica particles having size ranges of 100 nm to 1000 nm and porosities of 70 to 95%.

4. The process according to claim 1, wherein the molar ratio of Mg:$SiO_2$ in step (a) is at least 0.5 and at most 2.

5. The process according to claim 1, wherein in step (a), the maximum temperature reached is at least 500° C. and at most 1200° C.

6. The process according to claim 1, wherein the duration of step (a) is at least 30 min and at most 5 hrs.

7. The process according to claim 1, wherein in step (a), the maximum temperature is reached by heating from room temperature to the maximum temperature at a rate of at 1-30° C./min.

8. The process according to claim 1, wherein in step (b), the acidic medium consists of aqueous HCl.

9. The process according to claim 1, wherein for step (c), the molar ratio of Mg:$SiO_2$ is at least 2 and at most 8.

10. The process according to claim 1, wherein the maximum temperature for step (c) is at least 500° C. and at most 1200° C.

11. The process according to claim 1, wherein the duration of step (c) is at least 30 min and at most 5 hrs.

12. The process according to claim 1, wherein, the maximum temperature is reached by heating from room temperature at a rate of at least 0.5° C./min and at most 10° C./min in step (c).

13. The process according to claim 1, wherein the inert atmosphere in step (a) and/or step (c) contains at least one of the following: nitrogen ($N_2$), argon (Ar).

14. The process according to claim 7, wherein the rate is 10-30° C./min.

15. The process according to claim 10, wherein the maximum temperature is at least 600° C. and at most 800° C.

16. The process according to claim 13, wherein the inert atmosphere is at least argon.

17. The process according to claim 1, wherein in step (a) and step (b), the maximum temperature is at least 600° C. and at most 800° C.

* * * * *